(12) United States Patent
Hautvast et al.

(10) Patent No.: US 8,755,575 B2
(45) Date of Patent: Jun. 17, 2014

(54) TRANSMURAL PERFUSION GRADIENT IMAGE ANALYSIS

(75) Inventors: Gilion Leopold Theodorus Frederik Hautvast, Eindhoven (NL); Amedeo Chiribiri, Turin (IT); Sven Plein, Leeds (GB); Eike Caspar Cornelius Nagel, Berlin (GB)

(73) Assignee: Koninklijke Philips N.V., Eindhoven (NL)

( * ) Notice: Subject to any disclaimer, the term of this patent is extended or adjusted under 35 U.S.C. 154(b) by 44 days.

(21) Appl. No.: 13/146,813

(22) PCT Filed: Jan. 28, 2010

(86) PCT No.: PCT/IB2010/050376
§ 371 (c)(1),
(2), (4) Date: Jul. 28, 2011

(87) PCT Pub. No.: WO2010/086810
PCT Pub. Date: Aug. 5, 2010

(65) Prior Publication Data
US 2011/0286645 A1 Nov. 24, 2011

(30) Foreign Application Priority Data
Jan. 29, 2009 (EP) .................................. 09151667

(51) Int. Cl.
*G06K 9/46* (2006.01)
(52) U.S. Cl.
USPC .......................................... 382/128; 382/199
(58) Field of Classification Search
USPC ................................................ 382/128, 199
See application file for complete search history.

(56) References Cited

U.S. PATENT DOCUMENTS

| 2005/0124861 | A1 | 6/2005 | Breeuwer |
| 2009/0123047 | A1* | 5/2009 | Yfantis ......................... 382/131 |
| 2009/0147001 | A1* | 6/2009 | Buelow et al. ................ 345/424 |
| 2010/0004526 | A1* | 1/2010 | Wei et al. ...................... 600/407 |
| 2010/0098314 | A1* | 4/2010 | Huo et al. ..................... 382/132 |

FOREIGN PATENT DOCUMENTS

WO 0135339 A2 5/2001

OTHER PUBLICATIONS

Breeuwer, M. et al.: "Analysis of Volumetric Cardiac CT and MR Image Data" Medicamundi, Philips Medical Systems, Shelton, CT, US (Online) Vol. 47, No. 2, Aug. 1, 2003, pp. 41-53, XP008103930, ISSN: 0025-7664M OAGE 440 p. 59L Fugyre 1-20.

(Continued)

*Primary Examiner* — Jon Chang (57) ABSTRACT

A system (100) for analyzing a sequence of datasets representing sequential images of an object, a dataset associating data values with positions, the images having an image region having a first border (210) and a second border (220) associated with the object, the system comprising a ray establishing means (130) for establishing for individual images an analysis ray (232; 234; 236) connecting the first and second border of the image region, the analysis rays being in a respective position representing a substantially same position with respect to the object, a gradient establishing means (140) for establishing, for individual analysis rays, a gradient value which is representative of a rate of change in the data values across the image region and along the analysis ray from the first border to the second border. The system is well suited to locate perfusion deficits in the myocardium through the identification of transmural gradients.

20 Claims, 4 Drawing Sheets

(56) References Cited

OTHER PUBLICATIONS

Oeltze, S. et al.: "Integrated Visualization of Morphologic and Perfusion Data for the Analysis of Coronary Artery Disease" Eurographics, IEEE-VGTC Symposium on Visualization, XX, XX, Jan. 1, 2006, pp. 131-138, XP002512740, Abstract, Figs. 1-9, Sections 2-5.

Hisashi Masugata MD et al: Assessment of Coronary Stenosis Severity and Transmural Perfusion Gradient by Myocardial Contrast Echocardiography. Comparison of Gray-Scale B-Mode With Power Doppler Imaging, Circulation, Lippincot Williams and Wilkins, Baltimore, US, vol. 102 Jan. 1, 2000, p. 1427-1433.

Stegger L. et al.: "Elastic Surface Contour Detection for the Measurement of Ejection Fraction in Myocardial Perfusion SPET" European Journal of Nuclear Medicine, Springer, Berlin, Heidelberg, DE, vol. 28, No. 1, Jan. 1, 2001, pp. 48-55.

Wilke, Norbert et al. "Myocardial Perfusion Reserve: Assessment with Multisection, Quantitative, First-Pass MR Imaging". Cardiac Radiology 1997; 204: pp. 373-384.

Klocke, Francis et al. "Limits of Detection of Regional Differences in Vasodilated Flow in Viable Myocardium by First-Pass Magnetic Resonance Perfusion Imaging". Circulation, Journal of the American Heart Association. 2001; 104; pp. 2412-2416.

Lee, Daniel et al. "Magnetic Resonance Approaches and Recent Advances in Myocardial Perfusion Imaging". Current Cardiology Reports. vol. 8, Issue 1, Jan. 2006, pp. 59-64.

* cited by examiner

TRANSMURAL PERFUSION GRADIENT IMAGE ANALYSIS

FIELD OF THE INVENTION

The invention relates to a system for analyzing a sequence of datasets representing sequential images of an object.

The invention further relates to a corresponding method and computer program product.

BACKGROUND OF THE INVENTION

The most frequent heart disease is ischemia due to an at least partial occlusion (stenosis) of a coronary artery. Occlusion of a coronary artery may lead to a deficit in the perfusion of myocardial tissue. Various imaging modalities may be used to obtain data on the perfusion, e.g., MRI, PET, SPECT, CT, etc.

For example, cardiac MRI allows quantification of myocardial perfusion. In particular, first pass enhancement cardiac MRI may be used to assess the severity of perfusion deficits caused by coronary artery occlusions. In first pass enhancement cardiac MRI the uptake of a contrast agent in the myocardial tissue after the first pass of a contrast bolus is measured.

The contrast agent highlights the perfusion in the tissue. This procedure is often performed at rest and under stress, as perfusion deficits are often stress-induced. The stress may be induced by pharmacological agents that increase the heart rate. The contrast agent causes opacification, which is visible in the measured images, such as myocardial images. Typically, opacification is measured in gray-scale units from the video intensity on recorded images.

The measurement of the uptake of the contrast agent results in time-intensity curves. A time-intensity curve relates time, e.g., the time elapsed since the onset of the bolus passage, to the intensity of the uptake, e.g., at a particular location, or to the average intensity of the uptake at a particular segment, etc.

The quantification of myocardial perfusion can be a semi-quantitative or a true-quantitative analysis of the time-intensity curves. Semi-quantitative analysis includes the quantification of several characteristics of time-intensity curves, e.g., peak intensity, maximum up slope, mean transit time of the bolus passage, etc. In true quantitative analysis, the actual myocardial blood flow is calculated from a mathematical analysis of the arterial input function and the time-intensity curves obtained in the myocardium. A review of both semi-quantitative and true quantitative approaches is given in, e.g., M. Jerosh-Herold et al., "Analysis of myocardial perfusion MRI", JMRI 19(6):758-770, 2004. Note that time-intensity curves can be obtained from various imaging modalities.

Results from these analyses can be presented using various visualizations. For example, one or more of the time-intensity curves may be graphed. The time-intensity curves may also be visualized using, e.g., bulls eye plots, color overlays and perfuseograms. Perfuseograms are described, e.g., in US patent application 2005/0124861: "Cardiac Perfusion analysis", which is incorporated herein by reference.

European patent application EP1236177: "Automatic analysis of anatomical images time sequence", describes an apparatus for treating medical images. The apparatus allows the automatic segmentation of cardiac images. For each segment the apparatus can determine time/intensity curves. The time/intensity curves can be analyzed by computing, per segment, some parameters, including the trend of the concentration of the intravascular contrast medium in the organ tissues.

SUMMARY OF THE INVENTION

Current systems for analyzing a sequence of datasets representing sequential images of an object, as may be used for, e.g., diagnosing coronary artery disease, lack diagnostic capability. It would be advantageous to have an improved system for analyzing a sequence of datasets representing sequential images of an object.

To better address this concern, in a first aspect of the invention a system for analyzing a sequence of datasets representing sequential images of an object is presented, the dataset associating data values with positions, wherein the images have an image region having a first border and a second border associated with the object, the system comprising a ray establishing means for establishing for individual images an analysis ray connecting the first and second border of the image region, the analysis rays being in a respective position representing a substantially same position with respect to the object, a gradient establishing means for establishing, for individual analysis rays, a gradient value which is representative of a rate of change in the data values across the image region and along the analysis ray from the first border to the second border.

The system according to the invention determines a gradient at a particular place of the object, as represented by analysis rays, for the images. Since the analysis ray connects the first border with the second border, the analysis ray runs across the image region. Accordingly, a sequence of gradients is obtained, which represent the time-dependent development of the gradient. This makes it possible to inspect the established gradients and to diagnose deviation in the gradients from the norm.

In particular, the system may be applied if the image region represents a wall of a heart ventricle, the first border corresponds to an inner boundary of the wall and the second border corresponds to an outer boundary of the wall.

New imaging protocols allow assessment of uptake curves at higher resolution, enabling differentiation between endocardial and epicardial perfusion. The endocardium shows higher rest perfusion, but is more susceptible to ischaemia than the epicardium.

Coronary artery disease (CAD) not only reduces the local myocardial blood flow, but also causes transmural gradients in myocardial blood flow to be present. Therefore, the presence of transmural gradients in myocardial perfusion is a marker for CAD. Studies indicate that the ratio between endocardial and epicardial perfusion is correlated with the severity of the stenosis, see: "Assessment of Coronary Stenosis Severity and Transmural Perfusion Gradient by Myocardial Contrast Echocardiography: Comparison of Gray-Scale B-Mode with Power Doppler Imaging", Hisashi Masugata et al, in Circulation, 2000; 102; Pages: 1427-1433.

In this way, during the progression from wash-in to wash-out of a contrast agent, a moment may be observed in which the gradient at the analysis ray lies outside the range of healthy parameters. Since the occurrence of a gradient with at least a transmural component is indicative of CAD, the method according to the invention allows accurate diagnosis, and is therefore an improvement over existing analyzing methods.

Note that an analysis ray may be represented by one or more of its features. For example, only a starting point and an ending point may be established to be able to use an analysis ray. Optionally, the system comprises a data storage means for storing the established gradient values in a corresponding entry of an output data set, e.g., an output data array.

In a preferred embodiment, the ray determination means is configured to determine for each one of the images an intermediate border in between the first and second border, the analysis ray being determined substantially perpendicularly to the intermediate border.

It is observed that the transmural gradient is an especially important parameter. For example, the transmural gradient of the perfusion of the myocardium is a good indicator of CAD. By selecting the analysis ray to be transmural, the system is sensitized to these transmural gradients. Since the analysis ray is perpendicular to an intermediate border, the analysis ray will have such a transmural component. As a result, the system has an improved sensitivity. Moreover, selecting the analysis ray perpendicular to an intermediate border ensures that the results of the system can be dependably reproduced and that results of different patients can be sensibly compared. The intermediate border is a curve lying between the first and second border. All or part of the intermediate border may coincide with the first or second border.

In a preferred embodiment, the ray determination means is arranged for determining multiple analysis rays distributed along the image region.

By determining the progression in time of the gradient at multiple locations, i.e., at multiple analysis rays, a location with a perfusion deficit can be efficiently identified. In particular, when analyzing images of the myocardium, a location or segment of the myocardium with a perfusion deficit may be identified.

The gradient determination means is arranged for determining a gradient value for each combination of one of the multiple analysis rays and one of the images. The established gradients may be stored by a storage means in an output, such as an output array, which is at least a two-dimensional array having a first data-axis and a second data-axis. The data storage means is preferably arranged for storing gradient values corresponding to the same image along a same position of the first data-axis and for storing gradient values corresponding to the same analysis ray along a same position of the second data-axis.

It is noted that a system for analyzing a dataset representing an image of an object, the dataset associating data values with positions, wherein the image has an image region having a first border and a second border associated with the object, the system comprising a ray establishing means for establishing for the image multiple analysis rays distributed along the image region connecting the first and second border of the image region, a gradient establishing means for establishing for individual analysis rays, a gradient value which is representative of a rate of change in the data values across the image region and along the analysis ray from the first border to the second border, also has an independent inventive merit. Preferably the image is comprised in the sequence of images of the object.

In a preferred embodiment, the gradient establishing means is arranged for establishing a first quantity representative of the data values in a first region around an intersection of the analysis ray with the first border, establishing a second quantity representative of the data values in a second region around an intersection of the analysis ray with the second border, and wherein the gradient is representative of a ratio between the first and second quantity.

Particularly important are those moments in time when the epicardium is already well perfused with blood while the endocardium is not yet perfused to the same level, as these moments are indicative of stenosis between the first and second wall. It is therefore advantageous to have a system that computes gradients in this manner, accentuating the difference between endocardial and epicardial tissue. Establishing the first and second quantity may be performed by a first and second quantity establishment means, respectively.

In a preferred embodiment, the gradient establishing means is arranged for fitting the data values in the image region along the analysis ray from the first border to the second border to a curve of a pre-established function class, for establishing a gradient based on a slope of the curve.

To improve the results of the system in a quantitative respect the values may first be fitted to a curve of a predetermined function class. Preferably a parameterized function modeling blood flow in the myocardium is used for the function class. In this way, the correspondence between the values of the determined gradient and the actual change in transmural perfusion to the myocardium is improved. Presumably, a better correspondence between computed values and actual circumstances occurring in a patient's body improves the clinical relevance of the computed values and parameters.

In a preferred embodiment, the system comprises visualization means for visualizing established gradient values on a display device.

The gradient data may be visualized in various ways, preferably using color-codings. Various alternatives exist, for example, iso-gradient lines may be displayed. The points on an iso-gradient line represent analysis rays that have an equal gradient. Also the data may be represented using three-dimensional indications, or two-dimensional renderings of the three-dimensional indications. For example, arrows or bump maps shown extending from a surface, e.g., the surface of a rendering of an analyzed organ.

In a preferred embodiment, the visualization means is arranged for visualizing on a display region of the display device, one of the established gradient values being visualized as a specific color coded sub-region of the display region.

In this way, three parameters: the progression of time, the location of the gradient (the analysis ray) and the magnitude of the gradient can be plotted at once and on a flat surface. Combining all these parameters in this way improves the usefulness of such a plot, as a user of the system, e.g., a physician, can better see the location and severity of perfusion deficits.

In a preferred embodiment, the output comprises an output array that has two data-axes. The output array is visualized on a display region of the display device, which extends in two-dimensions, and wherein each specific one of the entries of the output array is visualized as a specific sub-region of the display region, which is color coded to represent the gradient value stored in the specific entry.

In a preferred embodiment, the system comprises a comparator means for identifying at least one combination of one of the multiple analysis rays and one of the images of which the established gradient value deviates from a pre-established expected gradient value or range of gradient values.

It is of advantage to assess the location and severity of a perfusion deficit, i.e., of gradients. By selecting multiple combinations, the location is determined, namely through the selection of the analysis rays. The severity is determined through selecting the gradients themselves (high gradients being indicative of severe perfusion deficit) and through the selection of the images (a high gradient which persists across many images, i.e., for a relatively long time, being indicative of severe perfusion deficit). In particular, high gradient values in many locations of the heart are an indication of a severe perfusion deficit. A particular form of high gradient values in many locations is the occurrence of high gradients across a large angle of a section of the myocardium, in particular across a consecutive angle. Accordingly, determining the extent, e.g. the angle, across which the gradients are higher than a pre-determined value, is of advantage.

In a preferred embodiment, the comparator means establishes a severity value of the identified at least one combination, which is representative of the number of identified at least one combination and/or magnitudes of the gradient values corresponding to the identified at least one combination.

It is of advantage if the severity of a perfusion deficit, found through the identification of deviant gradient values, can be summarized, preferably in a single value. The use of such a severity value can, e.g., be a factor in the determination if intervention is necessary. Moreover, the severity value can, e.g., be a factor in what type of intervention is currently advisable. For example, if the perfusion deficit is identified as "not so severe", no operation may be identified. If, however, the perfusion deficit is identified as "severe", an operation may be indicated.

In a preferred embodiment, the system comprises a summary means for establishing a summarizing value representing the magnitude of the gradients corresponding to analysis rays being in a position which represents a substantially same position with respect to the object.

In a sense, a gradient value can be said to summarize the progression of perfusion in a transmural direction at a particular place. The sequence of gradients in time, that is, the sequence of gradients for the multiple images, may be further summarized, for example, by taking an average, a maximum, a weighted summation of the sequence of gradients, etc. Eliminating the time factor opens up new ways to visualize, and/or analyze the gradient data.

In a preferred embodiment, the summary means is arranged for establishing a characteristic value for each of the entries of an output array having a same position along the second data-axis and placing the characteristic values in a summarizing array, wherein gradient values corresponding to the same analysis ray are stored in the output array along a same position of the second data-axis.

In a preferred embodiment, the summarizing values are displayed as an overlay on a representation of the object.

For example, the summarizing array is displayed as a color-coded overlay on a particular one of the images. For example, a cross section of the myocardium may be partitioned into multiple segments, each of which is colored according to a summarized value of that segment.

In a preferred embodiment, multiple summarizing arrays are determined for multiple sequences of two-dimensional arrays of values representing multiple images, wherein the multiple summarizing arrays are displayed as a color-coded overlay on a visualization of a three-dimensional object, and wherein each one of the multiple images represents a slice of the three-dimensional object.

For example, the three-dimensional object may be a representation of the myocardium. On the surface of the myocardium, it is indicated where perfusion deficits are present, and, in addition, through, e.g., a color coding also the severity of the deficit may be indicated.

In a preferred embodiment, the image region represents a wall of a heart ventricle, the first border corresponding to an inner boundary of the wall and the second border corresponding to an outer boundary of the wall. Preferably, the images are representative of perfusion in the wall.

In a preferred embodiment, a medical image acquisition apparatus comprises the system. In a preferred embodiment, a medical imaging workstation comprises the system.

A further aspect of the invention concerns a method of analyzing a sequence of datasets representing sequential images of an object, a dataset associating data values with positions, the images having an image region having a first border and a second border associated with the object, the method comprising the establishment, for individual images, of an analysis ray connecting the first and second border of the image region, the analysis rays being in a respective position representing a substantially same position with respect to the object, and the establishment, for individual analysis rays, of a gradient value which is representative of a rate of change in the data values across the image region and along the analysis ray from the first border to the second border.

A further aspect of the invention concerns a computer program product comprising instructions for causing a processor system to perform a method according to the invention.

The invention is defined by the independent claims. Advantageous embodiments are defined in the dependent claims.

It will be appreciated by those skilled in the art that two or more of the above-mentioned embodiments, implementations, and/or aspects of the invention may be combined in any way deemed useful.

Modifications and variations of the image acquisition apparatus, of the workstation, of the system, and/or of the computer program product, which correspond to the described modifications and variations of the system, can be carried out by a person skilled in the art on the basis of the present description.

A person skilled in the art will appreciate that the method may be applied to multidimensional image data, e.g., 2-dimensional (2-D), 3-dimensional (3-D) or 4-dimensional (4-D) images, acquired by various acquisition modalities such as, but not limited to, standard X-ray Imaging, Computed Tomography (CT), Magnetic Resonance Imaging (MRI), Ultrasound (US), Positron Emission Tomography (PET), Single Photon Emission Computed Tomography (SPECT), and Nuclear Medicine (NM).

BRIEF DESCRIPTION OF THE DRAWINGS

These and other aspects of the invention will be further elucidated and described with reference to the drawings, in which.

Throughout the Figures, similar or corresponding features are indicated by the same reference numerals.

DETAILED DESCRIPTION OF EMBODIMENTS

Figure 1:
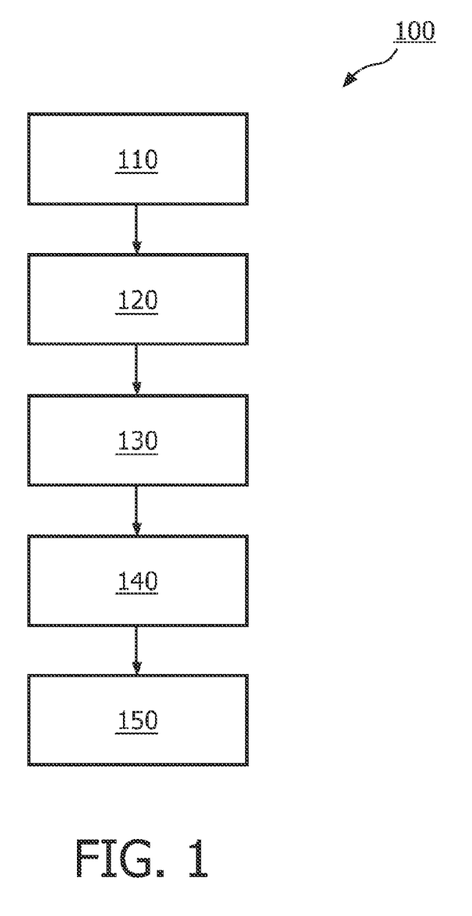
FIG. 1 is a schematic representation of an architecture for a system according to the invention.

In FIG. 1, the architecture of an image analyzing system 100 is schematically illustrated. The image analyzing system 100 comprises an image acquisition module 110, an image pre-processing module 120, a ray determination means 130, a gradient determination means 140 and a data storage means 150.

The various modules and means of system 100, such as an image pre-processing module 120, a ray determination means 130, a gradient determination means 140, may comprise, e.g., dedicated hardware, a microprocessor arranged for executing a suitable software program, or combinations thereof.

The image acquisition module 110 is arranged to acquire a suitable sequence of images, which are encoded using at least a two-dimensional array of values. The values may be floating point-type or integer-type. The values may be constraint to some range. For example, the values may be integers in a range from 0 up to and including 255. Various imaging modalities may be used to obtain image data, e.g., MRI, PET, SPECT, CT, etc. The images may be acquired from various objects. The system may be used to analyze objects into which a fluid permeates and/or perfuses, especially to diagnose such fluid permeation/perfusion. Preferably, images are acquired of living tissue into which a bodily fluid perfuses, e.g., ventricle walls. In particular, the invention is well suited to analyze the perfusion of blood into the wall of the left myocardial ventricle. The walls of the left myocardial ventricle are sufficiently thick to allow multiple measurements, in order to obtain a transmural gradient. It is observed that first pass enhancement cardiac MRI is well-suited to diagnose CAD, using the system and/or method according to the invention. However, many other image modalities may be used to advantage. In particular, power Doppler ultrasonography may be used as a lower cost alternative to cardiac MRI.

In a suitable embodiment, using first pass enhancement cardiac MRI, a patient is administered a contrast agent in the form of a contrast bolus. Preferably, a pulse bolus is used, wherein a relatively high dosage of the contrast agent is administered for a relatively short duration. Multiple images are obtained using an MRI (magnetic resonance imaging) device. The multiple images combine to give an insight into the way the contrast agent perfuses the organ of interest with respect to time. Preferably, gating is used when obtaining the multiple images. For example, when obtaining multiple cardiac MRI images, cardiac gating may be used. In cardiac gating one or more electrodes are placed on the chest to measure the cardiac cycle through an electrocardiogram. Each image is taken a fixed amount of time after a reference event in the electrocardiogram. Similarly, respiratory gating measures the respiratory cycle, and synchronizes the moment at which images are taken with the respiratory cycle.

Gating has the advantage that motion in the images is reduced. Movement of the myocardial ventricle walls will be much less from one image to another, when cardiac gating is used. The images show a comparatively stationary myocardium where the contrast agent first washes-in and later washes-out.

It is noted that the image acquisition module 110 is not necessarily integrated with the other modules of image analyzing system 100. For example, the images obtained by image acquisition module 110 may be forwarded using a computer network, a data storage means, wireless connection etc. The multiple images obtained via image acquisition module 110 are forwarded to image pre-processing module 120.

Image pre-processing module 120 will pre-process the images. Preferably, the images are filtered to enhance their content, e.g., using anisotropic filtering. On substantially each one of the images the first and second border are identified. The first and second border, e.g., the left ventricular contours, is delineated manually, semi-automatically or automatically, using any suitable, known delineation technique. The first and the second border define, e.g., enclose, the region of interest, that is, the region in which the perfusion is to be diagnosed. For example, the region is the wall of the left myocardial ventricle, or part thereof. Preferably, other disturbances are corrected as well. In particular, the motion of myocardial tissue caused by breathing of the patient may be corrected. For example, each of the images may be translated, stretched, skewed, affinely transformed, etc, so that the first and second border coincide in each of the processed images. Other known pre-processing methods may be applied to the images, if necessary, to reduce motion artifacts and enhance content. In the remainder of the text it is assumed that all images are processed.

Figure 2A:
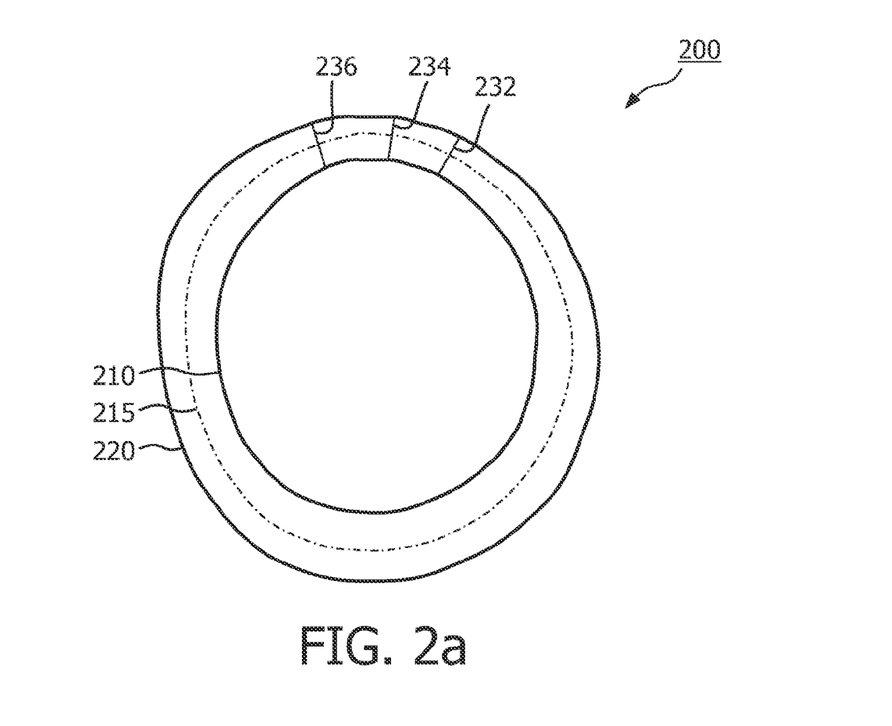
FIG. 2a is a drawing in cross section of a left myocardial ventricle.
Figure 2B:
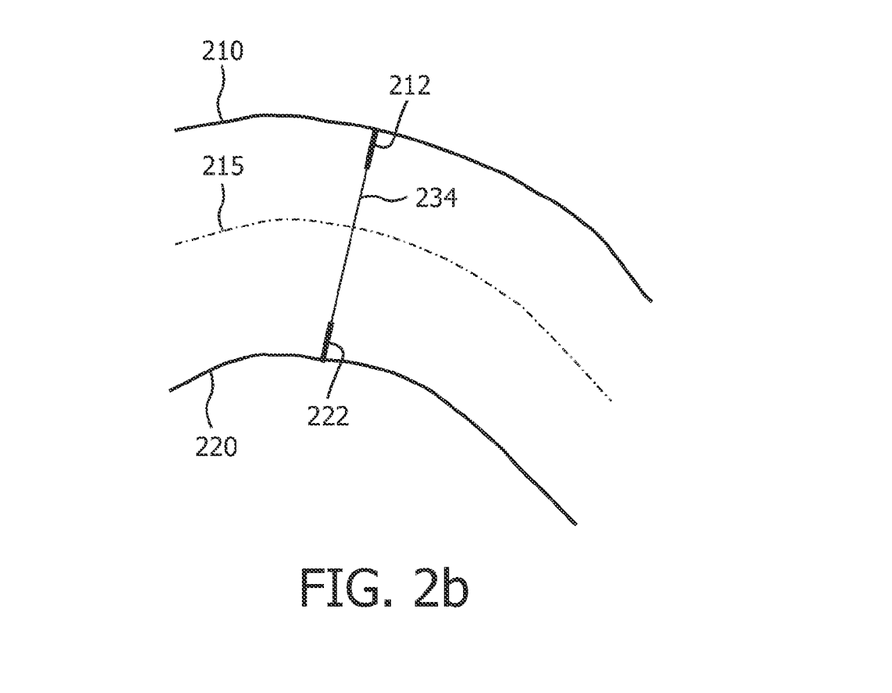
FIG. 2b is a detail of the cross section of the left myocardial ventricle.

FIGS. 2a an 2b illustrate the first and the second border. FIG. 2a shows the first border 210 and the second border 220 for an image 200. Image 200 may in practice be visualized as a color coded image. Typically, the color coding is a gray scale. The actual MRI image is not shown in image 200. In image 200 the inner and outer outlines of a cross section of the left myocardial ventricle are drawn. The region enclosed by first border 210 and second border 220 is a cross section of the wall-tissue of the left myocardial ventricle. Note that in image 200, first border 210 and second border 220 both form a closed curve. This is not necessary though; for example, if an image modality of sufficient resolution is used then perfusion may be diagnosed in, for instance, a vessel.

After the images have been pre-processed by image pre-processing module 120, time-intensity curves are sampled from the image data at positions across the myocardium, and optionally also along it. Optionally, these time-intensity curves may be filtered. To this end, the pre-processed images are forwarded, e.g., to ray determination means 130, to select an analysis ray. In FIG. 2a, three of such analysis rays are shown, and indicated by means of the reference numerals 232, 234 and 236. An analysis ray crosses the first border 210 and second border 220 and intersects the region enclosed therebetween. By analyzing the values measured with the image modality, a quantitative estimate can be made of the gradient of perfusion in the image. The gradient is representative of the rate at which the perfusion changes, or increases and/or decreases, between one region and another. Quantification of transmural gradients in myocardial perfusion can be used for accurate diagnosis and staging of ischemic heart disease. Preferably, a gradient is expressed as a single value, e.g., a scalar. However, it is also possible to express a gradient as a vector. Ray determination means 130 selects an analysis ray at substantially the same place for all of the images. For example, second analysis ray 234 is selected in image 200. Image 200 is only one image in a sequence of images. Accordingly, ray determination means 130 selects an analysis ray corresponding to the second analysis ray 234 in each image of the sequence of images, thus obtaining a sequence of analysis rays. Each one of the sequence of analysis rays substantially corresponds to the same place relative to the first and second border, or at least to one of them. Preferably, the sequence of analysis rays all correspond to substantially the same anatomical position in the patient's body.

The myocardium, and in particular the tissue of the walls of the left myocardial ventricle are supplied with blood via the coronary arteries. The blood arrives via three main vessels and is further distributed in vessels of ever decreasing size. The tissue of the myocardium may to some extent be modeled as a sponge into which a fluid, i.e., blood, is perfused. In a healthy heart, the blood would be distributed evenly over the tissue; in particular there would not be a gradient in the blood distribution. However, a stenosis in the coronary arteries may cause a gradient between the epicardial and the epicardial perfusion of the myocardium, which has at least a transmural component. Preferably, the analysis rays are chosen perpendicular to an intermediate border 215 lying in between the first border 210 and the second border 220. The intermediate border 215 may be determined by selecting the points exactly in the middle between first border 210 and second border 220, for example, as seen from a center point lying in the inner region enclosed by first border 210, i.e., the left ventricle itself. However, intermediate border 215 may also be chosen at other points in between first border 210 and second border 220. For example, intermediate border 215 may be chosen to lie at a percentage of the distance between first border 210 and second border 220 of, for example 10%; furthermore, intermediate border 215 may be chosen to lie at a certain number of pixels from first border 210 and/or second border 220, for example at a distance of three image pixels; etc.

In FIG. 2a, the analysis rays are indicated as straight line segments, but this is not necessary. An analysis ray may also be a broader segment extending over a region of the myocardium, for example, as in the AHA 17 segment model. An analysis ray need not be straight, but may, e.g., conform to a more advanced model of the blood flow in the myocardium.

In a preferred embodiment, after the processing of ray determination means 130, the first borders of all the images in the sequence of images coincide and all the second borders of all the images in the sequence of images coincide. In this way, it suffices to select the same relative position in the image to obtain a same position relative to the first and second border for the analysis ray.

The sequence of images is forwarded to a gradient determination means 140. The gradient determination means 140 is computed for each image and for each analysis ray in those images a gradient is computed. A gradient is a value which indicates the difference between the values along an analysis ray. Gradients may be computed in various ways, and some examples thereof are presented below.

As a first example of computing gradients, two quantities may be determined. The first quantity is representative of the values in a first region around the intersection of the analysis ray with the first border. In FIG. 2b, a first region 212 is indicated for analysis ray 234 as an example, being a section of analysis ray 234. The second quantity is representative of the values in a second region around the intersection of the analysis ray with the second border. In FIG. 2b, a second region 222 is indicated for analysis ray 234 as an example, being a section of analysis ray 234. A first and second region, such as regions 212 and 222 may also be chosen in other ways, e.g., a semi-circle. Preferably, the first and second region 212 and 222 are contained in the region defined by first border 210 and second border 220. In a preferred embodiment, a further check is done to ensure that regions 212 and 222 are contained in myocardial tissue. For example, it may be verified that the values in regions 212 and 222 are contained in a pre-determined expected range, or that the values in regions 212 and 222 and those in between on ray 234 form a continuum, e.g., do not contain a discontinuity of pre-determined magnitude. The gradient may be determined, e.g., as the ratio between first quantity and second quantity. Various corrections may be first applied, e.g., to correct for the occurrence of a particular small second quantity. It is observed that it is advantageous to select regions 212 and/or 222 based on a number of pixels, for example, they may be chosen to be three pixels wide, i.e., each quantity is based on three pixel values of the respective region.

As a second example of computing gradients, the values in the region along the analysis ray may be fitted to a curve of a pre-determined function class. For example, the values may be fitted to a linear function, or to a polynomial of some pre-determined degree, or to a gamma function, etc. The gradient may be taken as a slope of the fitted curve, or as a parameter of the fitted curve. The gradient may also be taken as representative of a second derivative of the values, fitted curve, etc. The gradient may be determined from the first border to the second border, or the other way round.

Ray determination means 130 may also determine multiple analysis rays. Preferably, ray determination means 130 determines multiple rays distributed along the region defined and/or enclosed by first border 210 and second border 220. In this way, a perfusion deficit can be identified as that part of the myocardium in which large gradients occur. For example, ray determination means 130 may distribute the analysis rays evenly along intermediate border 215.

In FIG. 2a, three of said multiple analysis rays are indicated: analysis rays 232, 234 and 236. Preferably, the analysis rays extend all the way around intermediate border 215.

Note that in case image analyzing system 100 uses a single analysis ray, image analyzing system 100 will determine multiple gradients, i.e., one gradient for each image in the multiple images. Ray determination means 130 is connected to a data storage means 150 for storing the determined gradients, temporarily and/or permanently. In case a single analysis ray is used, the output array may be a one-dimensional output array, which is indexed in the same way as the sequence of images. Typically, each entry of the one-dimensional output array will correspond to a certain point in time after the start of the recording of the measurements, i.e., typically after the onset of the bolus passage. The data storage means may be any suitable storage means, e.g., RAM memory, flash memory, hard disk, optical disk, network storage device, etc. In case image analyzing system 100 uses multiple analysis rays, ray determination means 130 will determine a gradient for each combination of an image in the sequence of images and an analysis ray of the multiple analysis rays. In the latter case, according to a preferred way of storing the information, use is made of a two-dimensional array.

Figure 3A:
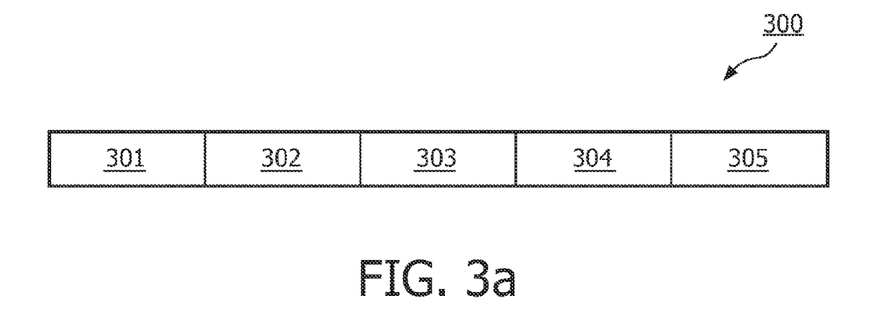
FIG. 3a is a schematic representation of a one-dimensional output array.
Figure 3B:
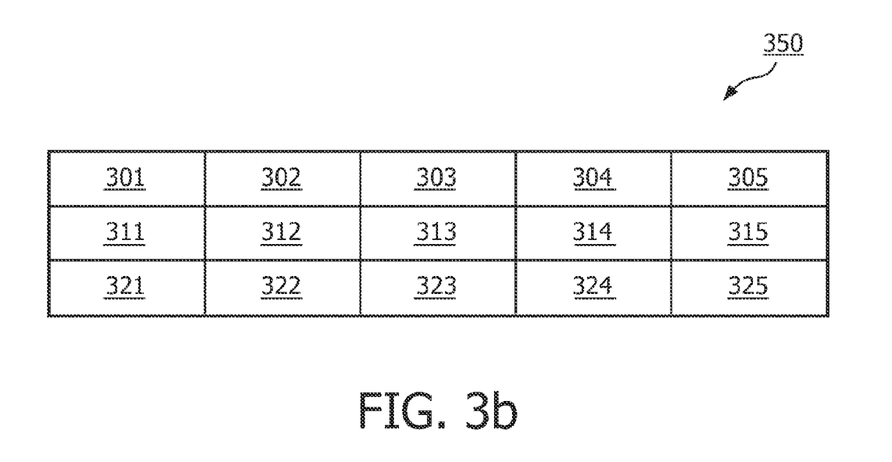
FIG. 3b is a schematic representation of a two-dimensional output array.

FIG. 3a and FIG. 3b give an example of a one-dimensional array and a two-dimensional array, respectively. FIG. 3a may be obtained by analyzing multiple images, using a single analysis ray. For example, array entry 301 may be obtained in a first image, for instance image 200, using, e.g., analysis ray 232. The next entry, i.e., array entry 302 is obtained in a next image (not shown) of the sequence of images, but at an analysis ray which is at the same relative position as the analysis ray 232 in image 200. If gated acquisition is used, some time will elapse between the image taken for array entry 301 and array entry 302. The elapsed time is approximately equal to the time of one cardiac cycle, which is about 1 second. Similarly, the next array entries 303, 304, and 305 are each taken in a next image, but at relatively the same analysis ray.

Both in FIGS. 3a and 3b each one of the array entries gives a gradient value for a particular image, i.e., at a particular time, and at a particular place, i.e., analysis ray. Two-dimensional output array 350 is obtained by analyzing three analysis rays. The entries 301 to 305 correspond to one analysis ray, analyzed for its gradient in multiple images. The entries 311 to 315 correspond to a further analysis ray, analyzed for its gradient in the same multiple images. The entries 321 to 325 correspond to yet a further analysis ray, also analyzed for its gradient in the same multiple images. Two-dimensional output array 350 has a first data-axis; gradient values corresponding to the same image are stored in two-dimensional output array 350 along a same position of the first data-axis. All entries in a column of two-dimensional output array 350 correspond to gradients determined in the same image, albeit at different places, i.e., analysis rays. Two-dimensional output array 350 has a second data-axis; gradient values corresponding to the same analysis ray are stored in two-dimensional output array 350 along a same position of the second data-axis. All entries in a row of two-dimensional output array 350 correspond to gradients determined for the same analysis ray, albeit in different images. It is convenient to order the images according to the time at which they were taken, e.g., the earliest image may correspond to the first column, and to order the analysis rays according to the order in which they occur in the image, e.g., according to the angle in a polar representation of the starting point of the analysis ray. However, the gradients may be recorded in the output array in any order.

The output array may be displayed on a display device, e.g., a computer monitor. For example, a one-dimensional array may be plotted, e.g., as a graph, a column chart, a scatter graph etc. A two-dimensional array may also be plotted, e.g., as multiple graphs, etc, as a surface graph, etc. This allows for a quick visual comparison between perfusion in endocardial and epicardial layers of the myocardium.

Figure 4:
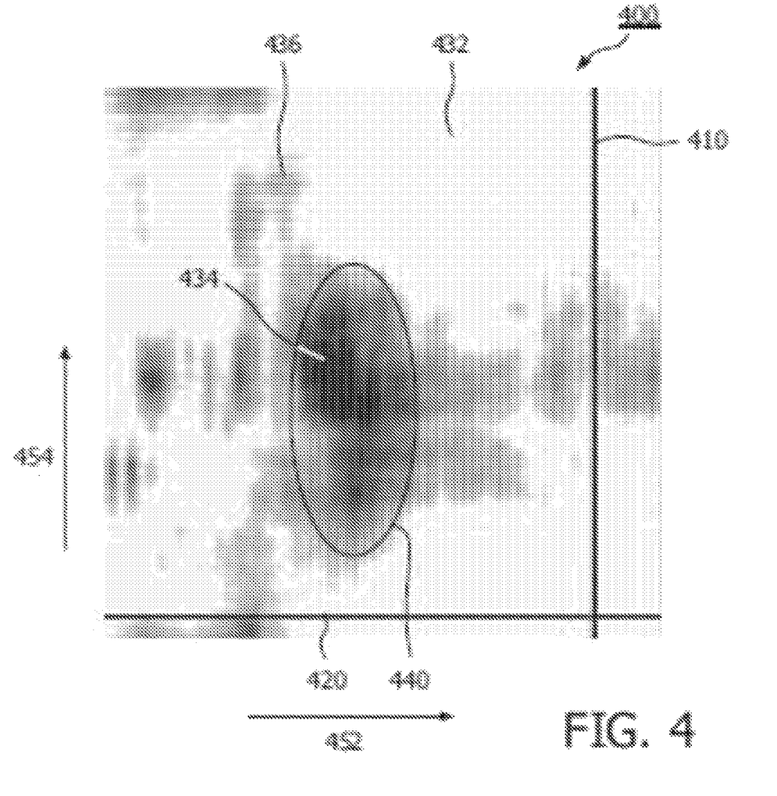
FIG. 4 is a visualization of a two-dimensional output array.

FIG. 4 shows a so-called gradientogram 400, which is a particularly advantageous way to plot the two-dimensional output array. Gradientogram 400 is shown on a display region of the display device, for example, a part of a computer monitor, such as a window, part of a print-out, etc. The display region extends at least in two dimensions, to represent the two dimensions of the output array. Preferably, each of the two dimensions of the display region corresponds one-to-one to the two axes of the output array. However, there may also be a transformation in between, e.g., mirroring, skewing or otherwise transforming the output array, before it is rendered. Each value, or at least part of the values, in the output array is depicted at a corresponding place in the display region. For example, each pixel in the display region corresponds to a value in the output array. More than one pixel may represent the same value; also more than one value may be represented in one pixel. A pixel is a sub-region of the display region. A sub-region is a connected part of the display used for rendering one or more than one values.

In FIG. 4, a first image axis 452 and a second image axis 454 are indicated. Pixels at the same position along first image axis 452 correspond to the same point in time, i.e., to the same image. Pixels at the same position along second image axis 454 correspond to the same place in the images, i.e., to the same analysis ray.

A sub-region, e.g., a pixel, may represent a gradient in a color coding. Various color codings may be used, for example, a gray scale, a color scale, cross hatching etc. Variations in gradient may correspond to variations to any one of: hue, saturation, lightness, value, colorfulness, chroma, texture, etc. Gradientogram 400 may be post-processed to improve its content, e.g., by increasing its contrast, by blurring, by sharpening etc. In FIG. 4, a gray scale is used, wherein white corresponds to a low gradient and black corresponds to a high gradient. For example, FIG. 4 shows a low-gradient area 432, a medium-gradient area 436 and a high-gradient area 434.

To enhance the interpretation of the gradientogram, characteristic time moments may be indicated in the gradientogram, e.g., by a line perpendicular to first image axis 452. For example, an indication may be given of a characteristic time moment related to the bolus passage, e.g., time of onset, time of peak, etc. In FIG. 4, first indication line 410 indicates such a characteristic time moment. First indication line 410 may also indicate a current dynamic, i.e., the source image that relates to that column in the gradientogram. The current dynamic may be simultaneously displayed on the display device.

Furthermore, characteristic places may be indicated in the gradientogram, for example, segment borders according to some segmentation system, such as the AHA 17 segment model, e.g., by a line perpendicular to second image axis 454. In FIG. 4, a second indication line 420 is drawn to indicate such a characteristic place. Second indication 420 may also represents a current angle indicated in a radar/polar plot, or a current source image. The gradient-time signal of that particular angular position is indicated.

Segmentation tools may be provided to enable segmentation of the perfusion deficit.

Given a segmented gradientogram, characteristic values of the perfusion deficit are calculated. Also, the position of the coronary arteries may be indicated by lines in the gradientogram. The right ventricular inflection points may be indicated by lines in the gradientogram. A cursor in the gradientogram may be linked to an image view, for viewing the images. This allows a visual indication of where and when a transmural perfusion gradient occurred. Preferably, the multiple images are shown in quick succession, as a movie, in which using a cursor or color, the location, extent and/or severity of a perfusion deficit is indicated.

Regions in gradientogram 400 with a high gradient are indicative of parts of the myocardium where blood perfuses only with difficulty, and as such these are indicative of stenosis and/or ischemia or an increased risk of ischemia.

Preferably, image analyzing system 100 comprises a comparator means (not shown) for selecting multiple combinations of one of the multiple analysis rays and one of the images of which the determined gradient value deviates from a pre-determined expected gradient value. FIG. 4 shows a set of selected combinations 440. The selection may be fully automatic, automatic with manual assistance, or fully manual. FIG. 4 shows a manual selection of an oval which, according to a cardiologist, is of clinical interest. However, the set of combinations may also be selected automatically. For example, an area may be chosen by selecting all gradients above a pre-determined gradient value. Small connected areas of limited extent may be disregarded.

Of set 440 various parameters may be computed, which indicate the severity of the perfusion deficit. For example, the extent of the area may be computed, that is the largest connected line in set 440, along the second image axis 454. This parameter is an indication of the extent of the perfusion deficit along the myocardium. The severity of a perfusion deficit does not necessarily depend only on the local reduction in myocardial blood flow, but also on the extent of the perfusion deficit. Also, the 'area' of set 440 may be determined, that is, the surface area in gradientogram 400. It may be computed as a surface integral over set 440. This parameter gives an indication of the extent of the perfusion deficit along the myocardium and the duration thereof. Also, the area may be computed but with a weighting applied to the values. Also, the sum of the gradients in set 440 may be divided by the extent. Various other parameters may be computed from a set of values such as set 440. Computing such parameters allows quantitative assessment of myocardial perfusion deficits, by quantification of transmural perfusion gradients obtained from images. Both semi- and true quantitative analysis may be used to quantify local myocardial blood flow.

The images from which the gradientogram is determined may be acquired from a patient at rest and/or under cardiac stress. Some perfusion deficits only reveal themselves under conditions of stress. Such a deficit may show no gradient in any part of the gradientogram obtained from images that represent the myocardium at rest.

In a further refinement, gradientogram 400 comprises a summary means for determining a characteristic value for each of the entries of the output array having a same position along the second data-axis. That is to say, the gradient values that correspond to the same place in the myocardium in the different images are summarized in a characteristic value. The characteristic value may be a scalar floating point value etc, but may also be, e.g., a vector. The characteristic values may be displayed in various ways, e.g., graphed. Preferably, the characteristic values are shown as a color-coded overlay on a particular one of the images, e.g., the first one, or a chosen one. A characteristic value is overlaid at a place to which the summarized gradients correspond.

The multiple images typically correspond to one section, or slice, of the myocardium. Multiple sections of the myocardium may be analyzed according the invention. For each section, a set of characteristic values may be determined. That is for each section values are determined that summarize the severity of the deviation of the gradients from the norm at a particular analysis ray. The summarizing values for the multiple sections may be displayed in a single plot, for example, using a bulls-eye plot. Also, multiple gradientograms may be shown for the image slices, e.g., next to each other, or as a movie. The summarizing values may be further summarized, per section, e.g., according to AHA 17. Preferably, the summarizing values are displayed as an overlay on a three dimensional model of the myocardium. Also, a two dimensional representation of the three dimensional model may be used, e.g., using a perspective plot. The characteristic values may also be displayed using various other graphing techniques. In particular, a radar or polar plot is an advantageous graph to use. Instead of showing characteristic data on a 3D-model, the data can also be shown in a polar plot per slice.

Probably, it is also worth mentioning that for all the mentioned alternatives, the horizontal indicator 420 can be interactively linked by position.

The system according to the invention, e.g., image analyzing system 100, may be integrated with a medical image acquisition apparatus, such as an MRI, etc. The system according to the invention, e.g., image analyzing system 100, may also be integrated with a medical imaging workstation.

Figure 5:
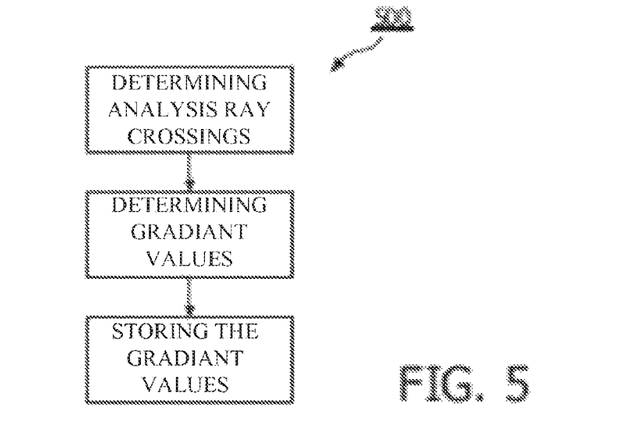
FIG. 5 is a flowchart illustrating a method according to the invention.

FIG. 5 illustrates in a flowchart a method 500 of analyzing a sequence of two-dimensional arrays of values representing images. For each one of the images a first and second border is indicated defining a region, for example, in a pre-processing step. The method comprises determining 510, for each specific one of the images, at least one analysis ray crossing the first and second border of the specific image, the analysis ray being in substantially the same position relative to the first and second border in substantially each one of the images. The method also comprises determining 520, for each one of the images, a gradient value which is representative of a rate of change in the values in the region and along the analysis ray from the first border to the second border. The method also comprises storing 530 each one of the determined gradient values in a corresponding entry of an output array.

The invention can be used to visualize the transmural gradient in myocardial blood flow. Furthermore, it may provide a quantification summarizing the severity of a perfusion deficit in one or more numbers, based on a segmentation indicated in a gradientogram. Fast and simple quantitative analysis of myocardial perfusion is thus provided.

The method may be executed using software which comprises instructions for causing a processor system to perform method 500. The software may be stored in a suitable storage medium, such as a hard disk, a floppy, a memory etc. The software may be sent as a signal along a wire, or wireless, or using a data network, e.g., the Internet. The software may be made available for download and/or for remote usage on a server.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. It will also be appreciated that such a program may have many different architectural designs. For example, a program code implementing the functionality of the method or system according to the invention may be subdivided into one or more subroutines. Many different ways to distribute the functionality among these subroutines will be apparent to the skilled person. The subroutines may be stored together in one executable file to form a self-contained program. Such an executable file may comprise computer executable instructions, for example, processor instructions and/or interpreter instructions (e.g. Java interpreter instructions). Alternatively, one or more or all of the subroutines may be stored in at least one external library file and linked with a main program either statically or dynamically, e.g. at run-time. The main program contains at least one call to at least one of the subroutines. Also, the subroutines may comprise function calls to each other. An embodiment relating to a computer program product comprises computer executable instructions corresponding to each of the processing steps of at least one of the methods set forth. These instructions may be subdivided into subroutines and/or stored in one or more files that may be linked statically or dynamically. Another embodiment relating to a computer program product comprises computer-executable instructions corresponding to each of the means of at least one of the systems and/or products set forth. These instructions may be subdivided into subroutines and/or stored in one or more files that may be linked statically or dynamically.

The carrier of a computer program may be any entity or device capable of carrying the program. For example, the carrier may include a storage medium, such as a ROM, for example a CD ROM or a semiconductor ROM, or a magnetic recording medium, for example a floppy disc or hard disk. Further, the carrier may be a transmissible carrier such as an electrical or optical signal, which may be conveyed via electrical or optical cable or by radio or other means. When the program is embodied in such a signal, the carrier may be constituted by such a cable or other device or means. Alternatively, the carrier may be an integrated circuit in which the program is embedded, the integrated circuit being adapted for performing, or for use in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

LIST OF REFERENCE NUMERALS 100 an image analyzing system
110 an image acquisition module
120 an image pre-processing module
130 a ray determination means
140 a gradient determination means
150 a data storage means
200 an image
210 a first border
212 a first region
215 an intermediate border
220 a second border
222 a second region
232 a first analysis ray
234 a second analysis ray
236 a third analysis ray
300 a one-dimensional output array
301-325 an array entry
350 a two-dimensional output array
400 a gradientogram
410 a first indication line
420 a second indication line
432 a low-gradient area
436 a medium-gradient area
434 a high-gradient area
440 a set of selected combinations
452 a first image axis
454 a second image axis
500 a method of analyzing a sequence of two-dimensional arrays of values representing images
510 determining an analysis ray
520 determining a gradient value
530 storing determined gradient values in an output array

The invention claimed is:

1. A system for analyzing a sequence of datasets representing sequential images of an object, a dataset associating data values with positions, the images having an image region having a first border and a second border associated with the object, the system comprising
a ray establishing means for establishing for each individual image an analysis ray connecting the first and second border of the image region, the analysis rays being in a respective position representing a substantially same position with respect to the object, wherein the sequential images of the object are a time series of images of a same location of the object,
a gradient establishing means for establishing, for each of the individual analysis rays, a gradient value which is representative of a rate of change in the data values along the analysis ray from the first border to the second border.

2. The system as in claim 1, wherein
the ray establishing means is arranged for establishing, for individual images, multiple analysis rays distributed along the image region.

3. The system as in claim 1, wherein the gradient establishing means is arranged for establishing a first quantity representative of the data values in a first region around an intersection of the analysis ray with the first border, establishing a second quantity representative of the data values in a second region around an intersection of the analysis ray with the second border, and wherein the gradient is representative of a ratio between the first and second quantity.

4. The system as in claim 1, wherein the gradient establishing means is arranged for fitting the data values in the image region along the analysis ray from the first border to the second border to a curve of a pre-established function class, for establishing a gradient based on a slope of the curve.

5. The system as in claim 1, comprising visualization means for visualizing established gradient values on a display device.

6. The system as in claim 5, wherein the visualization means is arranged for visualizing, on a display region of the display device, one of the established gradient values being visualized, as a specific color coded sub-region of the display region.

7. The system as in claim 2, wherein the system comprises a comparator means for identifying at least one combination of one of the multiple analysis rays and one of the images, of which the established gradient value deviates from a pre-established expected gradient value or range of gradient values.

8. The system as in claim 7, wherein the comparator means establishes a severity value of the identified at least one combination, which is representative of the number of identified at least one combination and/or magnitudes of the gradient values corresponding to the identified at least one combination.

9. The system as in claim 2, wherein the system comprises a summary means for establishing a summarizing value for representing the magnitude of the gradients corresponding to analysis rays being in a position representing a substantially same position with respect to the object.

10. The system as in claim 9, wherein the summarizing values are displayed as an overlay on a representation of the object.

11. The system as in claim 1, wherein the image region represents a wall of a heart ventricle, the first border corresponding to an inner boundary of the wall and the second border corresponding to an outer boundary of the wall.

12. A medical image acquisition apparatus comprising the system according to claim 1.

13. A medical imaging workstation comprising the system according to claim 1.

14. A method of analyzing a sequence of datasets representing sequential images of an object, a dataset associating data values with positions, the images having an image region having a first border and a second border associated with the object, the method comprising
establishing, for each individual image, an analysis ray connecting the first and second border of the image region, the analysis rays being in a respective position representing a substantially same position with respect to the object, wherein the sequential images of the object are a time series of images of a same location of the object,
establishing, for each of the individual analysis rays, a gradient value which is representative of a rate of change in the data values across the image region and along the analysis ray from the first border to the second border.

15. A computer memory encoded with instructions, for analyzing a sequence of datasets representing sequential images of an object, a dataset associating data values with positions, the images having an image region having a first border and a second border associated with the object, that when executed by a processor cause the processor to:
establish, for each individual image, an analysis ray connecting the first and second border of the image region, the analysis rays being in a respective position representing a substantially same position with respect to the object, wherein the sequential images of the object are a time series of images of a same location of the object, establish, for each of the individual analysis rays, a gradient value which is representative of a rate of change in the data values across the image region and along the analysis ray from the first border to the second border.

16. The method as in claim 14, the establishing, further comprising:
    establishing a first quantity representative of the data values in a first region around an intersection of the analysis ray with the first border; and
    establishing a second quantity representative of the data values in a second region around an intersection of the analysis ray with the second border, and wherein the gradient is representative of a ratio between the first and second quantity.

17. The method as in claim 14, the establishing, further comprising:
    fitting the data values in the image region along the analysis ray from the first border to the second border to a curve of a pre-established function class, for establishing a gradient based on a slope of the curve.

18. The method as in claim 14, wherein the image region represents a wall of a heart ventricle, the first border corresponding to an inner boundary of the wall and the second border corresponding to an outer boundary of the wall.

19. The computer memory as in claim 15, the instructions, when executed by the processor, further cause the processor to:
    establish a first quantity representative of the data values in a first region around an intersection of the analysis ray with the first border; and
    establish a second quantity representative of the data values in a second region around an intersection of the analysis ray with the second border, and wherein the gradient is representative of a ratio between the first and second quantity.

20. The computer memory as in claim 15, the instructions, when executed by the processor, further cause the processor to:
    fit the data values in the image region along the analysis ray from the first border to the second border to a curve of a pre-established function class, for establishing a gradient based on a slope of the curve.

* * * * *